United States Patent [19]
Beecken

[11] 3,920,720
[45] Nov. 18, 1975

[54] STYRYL DYESTUFFS
[75] Inventor: Hermann Beecken, Schildgen, Germany
[73] Assignee: Bayer Aktiengesellschaft, Leverkusen-Bayerwerk, Germany
[22] Filed: Apr. 3, 1974
[21] Appl. No.: 457,616

[30] Foreign Application Priority Data
Apr. 4, 1973 Germany............................ 2316766

[52] U.S. Cl..................... 260/465 E; 8/54.2; 8/179; 260/240 R; 260/306; 260/307 D; 260/465 D
[51] Int. Cl.²..................................... C07C 121/78
[58] Field of Search........ 260/465 E, 465 D, 240 R, 260/306, 307 D

[56] References Cited
UNITED STATES PATENTS
3,787,476 1/1974 Lohe et al............................ 260/465
3,829,461 8/1974 Lane et al............................ 260/465

Primary Examiner—Lewis Gotts
Assistant Examiner—Dolph H. Torrence
Attorney, Agent, or Firm—Plumley & Tyner

[57] ABSTRACT
Styryl dyestuffs of the formula

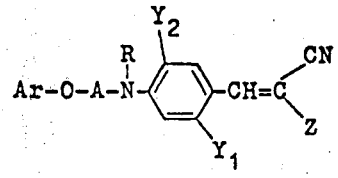

wherein
Ar denotes a phenyl radical which contains at least one alkyl, phenylalkyl, cycloalkyl, alkylmercapto, cycloalkylmercapto, phenylalkylmercapto, phenylmercapto or heterylmercapto substituent and is optionally substituted or denotes a phenyl radical containing at least 3 chlorine atoms, or represents an optionally partially hydrogenated napthyl radical.
A represents a alkylene group,
R denotes a alkyl, cycloalkyl or phenylalkyl group,
$Y_1$ and $Y_2$ denote hydrogen, alkyl, alkoxy, phenoxy, halogen, alkanoylamino or benzoylamino, and
Z represents a cyano, sulphonyl, ester or amide group as well as their preparation and their use for the dyeing of hydrophobic fibre materials.

10 Claims, No Drawings

STYRYL DYESTUFFS

The present invention relates to sparingly water-soluble or water-insoluble styryl dyestuffs of the formula

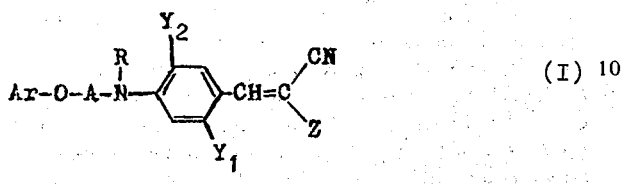

wherein

Ar denotes a phenyl radical which contains at least one $C_3$- to $C_{12}$-alkyl, phenyl-$C_1$- to -$C_3$-alkyl, $C_5$- to $C_7$-cycloalkyl, $C_1$- to $C_{12}$-alkylmercapto, $C_5$- to $C_7$-cycloalkylmercapto, phenyl-$C_1$- to $C_3$-alkylmercapto, phenylmercapto or heterylmercapto substituent and is optionally substituted by further $C_1$- to $C_4$-alkyl, $C_5$- to $C_7$-cycloalkyl, phenyl-$C_1$- to -$C_3$-alkyl or halogen radicals, or denotes a phenyl radical containing at least 3 chlorine atoms, or represents an optionally partially hydrogenated naphthyl radical, A represents a $C_2$- to $C_4$-alkylene group, R denotes a $C_1$- to $C_4$-alkyl, $C_5$- to $C_7$-cycloalkyl or phenyl-$C_1$- to -$C_3$-alkyl group, $Y_1$ and $Y_2$ denote hydrogen, $C_1$- to $C_4$-alkyl, $C_1$- to $C_4$-alkoxy, phenoxy, halogen, $C_2$- to $C_5$-alkanoylamino or benzoylamino, and Z represents -CN, -$SO_2Q$, -$COQ^1$, -$CO_2Q^2$ or $$-CON\begin{matrix}W^1\\W^2\end{matrix}$$

wherein

Q, $Q^1$, $Q^2$, $W^1$ and $W^2$ are $C_1$- to $C_4$-alkyl, $C_5$- to $C_7$-cycloalkyl or phenyl-$C_1$- to -$C_3$-alkyl, Q, $Q^1$, $W^1$ or $W^2$ also denote phenyl or naphthyl and $W^1$ and $W^2$ furthermore denote hydrogen or the remaining members of a 5-membered to 7-membered saturated heterocyclic structure and the alkyl radicals mentioned above in any context can be substituted, for example by OH, CN, halogen or $C_1$- to $C_4$-alkoxy and the phenyl and naphthyl radicals mentioned in any context can be substituted, for example by halogen, $C_1$- to $C_4$-alkyl, benzyl, cyclopentyl, cyclohexyl or $C_1$- to $C_4$-alkoxy, and to their preparation and use for dyeing and printing synthetic fibre materials.

Within the scope of the present invention, halogen is preferably understood as chlorine and bromine.

Preferred dyestuffs are those of the formula I wherein Ar represents the

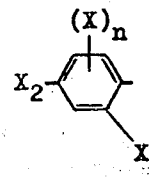

radical wherein $X_1$ and $X_2$ denote hydrogen, propyl, isopropyl, butyl, isobutyl, tert.-butyl, isoamyl, isooctyl, isononyl, lauryl, cyclopentyl, cyclohexyl, bicyclo[2.2.1]hept-2-yl, benzyl, α,α-dimethylbenzyl, phenethyl, methylmercapto, ethylmercapto, propylmercapto, butylmercapto, benzylmercapto, phenylmercapto, 4-tert.-butylphenylmercapto, 4-chlorophenylmercapto, 4-methylphenylmercapto or benzthiazol-2-ylmercapto, with the proviso that $X_1$ and $X_2$ are not simultaneously hydrogen, X denotes hydrogen, methyl, ethyl, tert.-butyl or chlorine, n represents 1 or 2 and A represents ethylene, $Y_1$ represents hydrogen, methyl, ethyl, methoxy, ethoxy or chlorine, $Y_2$ represents hydrogen, methyl, methoxy, ethoxy or chlorine, Z represents CN, $C_1$- to $C_4$-alkoxycarbonyl or phenalkoxycarbonyl with 1 to 3 carbon atoms in the alkoxy radical, phenylcarbamoyl or naphthylcarbamoyl and R represents $C_1$- to $C_4$-alkyl or phenyl-$C_1$- to -$C_3$-alkyl and also those dyestuffs of the formula I in which X, n, A, $Y_1$, $Y_2$, $Z_1$ and R have the abovementioned meanings and wherein Ar represents a naphthalene or 5,6,7,8-tetrahydronaphthalene radical which can be substituted by 1–2 propyl, isopropyl, butyl, isobutyl, tert.-butyl, isoamyl, isooctyl, lauryl, cyclopentyl, cyclohexyl, bicyclo[2.2.1]hept-2-yl, benzyl, $C_1$- to $C_4$-alkylmercapto, benzylmercapto or phenylmercapto groups and/or 1–2 halogen atoms.

Particularly preferred dyestuffs are those of the formula I wherein

Ar represents

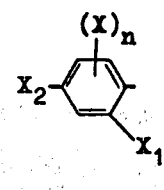

wherein $X_1$ and $X_2$ denote hydrogen, isobutyl, tert.-butyl, cyclohexyl, cyclopentyl, issoctyl, α,α-dimethylbenzyl, benzyl or bicyclo[2.2.1]hept-2-yl, but do not simultaneously represent hydrogen and X, n, A, R, $Y_1$, $Y_2$ and Z have the abovementioned meanings and those of the formula I wherein Ar represents tetrachlorophenyl, methyltetrachlorophenyl or pentachlorophenyl and A, R, $Y_1$, $Y_2$ and Z have the abovementioned meanings.

The new dyestuffs are prepared in a manner which is in itself known by reacting aldehydes of the formula

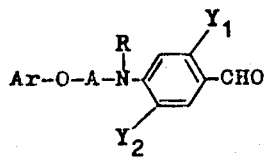 (II)

or their functional derivatives of the formula

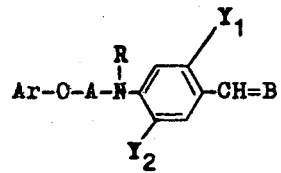 (III)

wherein
Ar, A, R, Y$_1$ and Y$_2$ have the meanings mentioned under the formula I and
B represents N-R$_1$ (aldimines) or

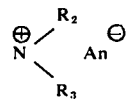

(imonium salts)
wherein
R$_1$ preferably denotes a phenyl, sulphophenyl or carboxyphenyl radical,
R$_2$ and R$_3$ both represent C$_1$- to C$_4$-alkyl and
R$_3$ also represents phenyl and
An$^-$ represents an acid anion
with methylene-active compounds of the formula

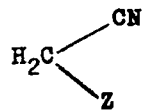 (IV)

wherein
Z can have the meanings indicated under the formula I.

The reactions are carried out at temperatures between 20° and 160°C, preferably in the temperature range of 50°–120°C, in the melt or, in mos cases, in a solvent which is inert under the reaction conditions. As examples of suitable solvents there may be mentioned lower aliphatic alcohols with 1 to 4 carbon atoms, especially methanol, ethanol, the propanols and butanols, and also benzene, toluene, xylene, chlorobenzene, dichlorobenzenes, chloroform, dimethylformamide, dimethylsulphoxide and acetonitrile. To accelerate the reaction, the basic catalysts customary for the Knoevenagel reaction can be added, such as, for example, ammonia, diethylamine, triethylamine, piperidine, morpholine, N-ethylpiperidine, N-methylmorpholine, basic ion exchange resins, alkali metal hydroxides, alkali metal alcoholates, alkali metal carbonates, alkali metal acetates and acetates of ammonia and of organic bases such as, for example, ammonium acetate or piperidine acetate. However, the reaction can also be carried out successfully in the presence of acetic acid and even in glacial acetic acid as the solvent.

It is also possible to dispense, with advantage, with the customary isolation of the aldehydes II, which in most cases entails substantial losses, and to use these aldehydes directly, after decomposition of excess Vilsmeier reagent by lower aliphatic alcohols, and adjusting the pH value to about 6.5–8.5 for condensations with the methylene-active components IV. Here, the presence of an emulsifying additive, for example of oxethylation products of higher alcohols or substituted phenols, can be useful, especially if aqueous alkali or aqueous ammonia are used to adjust the pH.

Examples of suitable methylene-active compounds IV are malonic acid dinitrile, cyanoacetic acid methyl ester, cyanoacetic acid ethyl ester, cyanoacetic acid propyl ester, cyanoacetic acid butyl ester, cyanoacetic acid cyclohexyl ester, cyanoacetic acid γ-methoxypropyl ester, cyanoacetic acid cyanoethyl ester, cyanoacetic acid β-chloroethyl ester, cyanoacetic acid β-acetoxyethyl ester, cyanoacetic acid benzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid β-phenoxyethyl ester, cyanoacetic acid β-(4-chlorophenoxy)-ethyl ester, cyanoacetic acid β-(4-methylphenoxy)-ethyl ester, cyanoacetic acid β-(4-tert.-butylphenoxy)-ethyl ester, cyanoacetic acid β-(4-cyclohexylphenoxy)-ethyl ester, cyanoacetic acid γ-phenoxypropyl ester, cyanoacetic acid β-phenylethyl ester, cyanoacetic acid γ-phenylpropyl ester, cyanoacetic acid γ-phenylallyl ester, cyanoacetic acid α-naphthylmethyl ester, cyanoacetamide, cyanoacetic acid N-methylamide, cyanoacetic acid N,N-dimethylamide, cyanoacetic acid β-cyanoethylamide, cyanoacetic acid N-n-butylamide, cyanoacetic acid cyclohexylamide, cyanoacetic acid diethylamide, cyanoacetic acid pyrrolidide, cyanoacetic acid piperidide, cyanoacetic acid anilide, cyanoacetic acid 3-chloroanilide, cyanoacetic acid 2-ethoxyanilide, cyanoacetic acid 4-t-butylanilide, cyanoacetic acid 4-cyclohexylanilide, cyanoacetic acid α-naphthylamide, methylsulphonylacetonitrile, n-butylsulphonylacetonitrile, phenylsulphonylacetonitrile and 4-t-butylphenylsulphonylacetonitrile.

The preparation of suitable aldehydes II or imonium salts III starts from aromatic bases of the formula

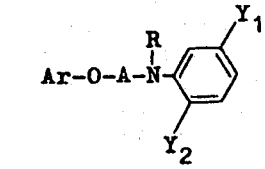 (V)

wherein
the symbols Ar, A, R, Y$_1$ and Y$_2$ have the meanings indicated under the formula I.

The bases are reacted in a manner which is in itself known with so-called Vilsmeier reagents, that is to say mixtures of N-formyl compounds

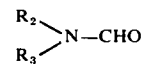

and inorganic acid halides, preferably phosphorus oxychloride, thionyl chloride or phosgene, or are formylated by the method of Duff (Journal of the Chemical Society [London] 1952, pages 1,159–1,164) advantageously in the variant of German Pat. Specification No. 1,206,879. Suitable aldimines III are obtained, for example, in accordance with the instructions in U.S. Pat. No. 2,583,551 (Example 17).

The bases V can be prepared in various ways which are in themselves known; the following may be mentioned here:

a. Reaction of compounds capable of N-alkylation, of the formula VI, with secondary aromatic amines of the formula VII in the presence of customary acid-binding additives, in accordance with the following equation

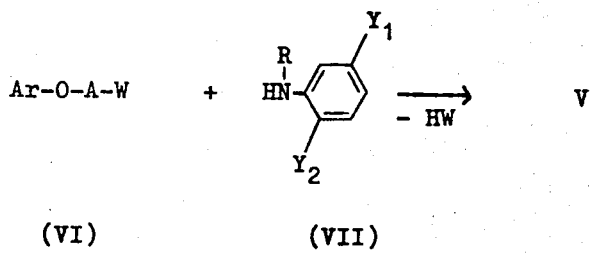

(VI)    (VII)

wherein
  Ar, A, R, $Y_1$ and $Y_2$ have the meanings indicated under the formula I whilst
  W represents, for example, chlorine, bromine, iodine, $CH_3SO_3$, $C_6H_5SO_3$ or $CH_3-C_6H_4SO_3$, but preferably denotes chlorine or bromine,
it being possible to add catalytic amounts of sodium iodide or potassium iodide to facilitate the reaction between VI and VII. (Compare German Auslegeschrift (German Published Specification) 2,010,491, Example 2).

b. Reaction of phenolates of the formula VIII with tertiary bases capable of O-alkylation, of the formula IX, in accordance with

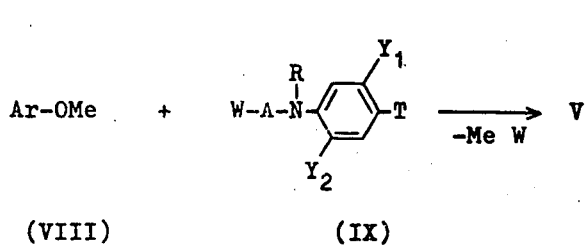

(VIII)    (IX)

in which formulae
  Ar, A, R, $Y_1$, $Y_2$ and W have the meanings indicated under (a),
  T represents hydrogen and Me represents one equivalent of an alkali metal, alkaline earth metal or heavy metal ion.

The ions of lithium, sodium, potassium, magnesium, calcium, lead, copper or silver, preferably of sodium and potassium, may be mentioned as examples. The phenolates VIII can appropriately also be produced from the corresponding phenols in the reaction medium itself — optionally in the presence of the compounds IX — by adding one equivalent of a suitable metal compound, such as, for example, of the oxide, hydroxide, bicarbonate, carbonate or the like.

c. By thermal elimination of carbon dioxide from mixed carbonic acid esters of the formula

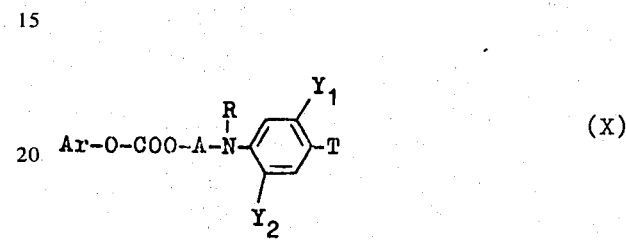

wherein
  Ar, A, R, $Y_1$, $Y_2$ and T have the meanings indicated under the formula V.

The preparation and thermal decomposition of the compounds X is carried out in a manner which is in itself known. For the preparation, chloroformic acid esters of the formula XI are reacted with hydroxyalkyl compounds of the formula XII in inert solvents and in the presence of customary acid-binding additives such as, for example, alkali metal carbonates or pyridine bases, in accordance with the equation

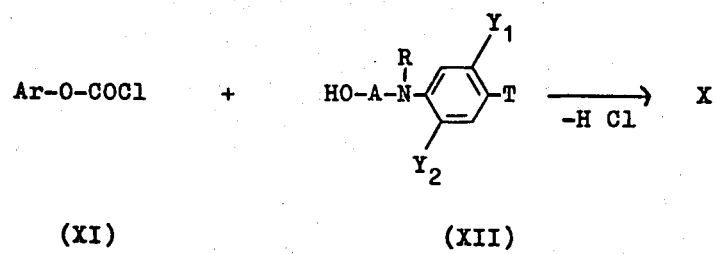

(XI)    (XII)

or phenolates VIII are reacted with chloroformic acid esters XIII in accordance with the equation

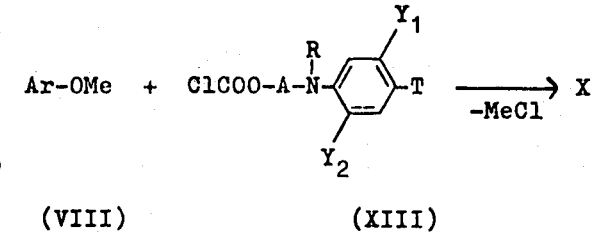

(VIII)    (XIII)

The reactions according to b) and c) can advantageously also be carried out with compounds IX and X in which
  T, instead of representing hydrogen, denotes a formyl group (T=CHO) or the

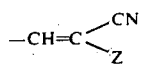

group and

Z has the meanings indicated under the formula I so that the aldehydes of the formula II or the corresponding styryl dyestuffs I are obtained directly.

The following may be mentioned as suitable secondary bases VII from which the compounds XII (T=H) are obtainable in a known manner by oxalkylation, for example by means of ethylene carbonate, ethylene oxide or propylene oxide, or by reaction with halogenoalkanols, for example β-halogenoethanols, halogenopropanols anad halogenobutanols, whilst from the compounds XII the intermediate products IX (T=H) are obtainable with the aid of acid halides, such as phosphorus oxychloride, phosphorus tribromide, methanesulphochloride, benzenesulphochloride and toluenesulphochloride, or the intermediate products IX (T=CHO) are directly obtainable by Vilsmeier formylation, or the chloroformic acid esters XIII are smoothly obtainable by means of phosgene:

N-methylaniline, N-methyl-m-toluidine, N-ethylaniline, N-ethyl-m-toluidine, N-methyl-m-phenetidine, N-ethyl-m-phenetidine, N-propylaniline, N-propyl-m-toluidine, N-propyl-m-anisidine, N-n-butylaniline, N-n-butyl-m-toluidine, N-n-butyl-m-anisidine, N-butyl-m-phenetidine, N-methyl-m-phenoxyaniline, N-ethyl-m-phenoxyaniline, N-ethyl-o-toluidine, N-methyl-2-ethylaniline, N-methyl-2-isopropylaniline, N-methyl-2,5-dimethylaniline, N-ethyl-2,5-dimethoxyaniline, N-methyl-2,5-diethoxyaniline, N-propyl-3-isopropylaniline, N-methyl-2-methoxy-5-methylaniline, N-ethyl-3-bromoaniline, N-butyl-3-chloroaniline, N-chlorohexylaniline, N-cyclopentyl-m-ethylaniline, N-ethyl-3-chloroaniline, N-methyl-2,5-dichloroaniline, N-butyl-3-acetaminoaniline, N-ethyl-3-benzoylaminoaniline, N-propyl-3-propionylaminoaniline, N-methyl-3-isobutyrylaminoaniline, N-benzylaniline, N-benzyl-m-toluidine, N-benzyl-m-anisidine, N-benyl-m-phenetidine, N-benzyl-2,5-dimethylaniline, N-benzyl-m-isobutoxyaniline, N-benzly-m-isopropylaniline, N-benzyl-2,5-dimethoxyaniline, N-benzyl-3-chloroaniline, N-benzyl-2,5-dichloroaniline, N-benzyl-3-acetaminoaniline, N-β-phenylethyl-aniline, N-α-phenylethyl-aniline, N-β-phenylpropylaniline, N-γ-phenylpropyl-aniline, N-β-phenylethyl-m-toluidine, N-α-phenylethyl-m-toluidine, N-β-phenylpropyl-m-toluidine, N-γ-phenylpropyl-m-toluidine, N-γ-phenylpropyl-m-chloroaniline, N-γ-phenylpropyl-2,5-diethoxyaniline, N-butyl-3-trifluoromethylaniline, N-β-cyanoethyl-m-toluidine, N-β-phenoxyethyl-m-phenetidine, N-γ-ethoxypropyl-m-bromoaniline, N-ethyl-3-phenylaniline and N-γ-(4-methylphenoxy)-propyl-m-toluidine.

Suitable intermediate products for the preparation of the bases V are, in addition to the bases VII mentioned by way of examples in the preceding list, the corresponding N-β-hydroxyethyl-, N-β-hydroxypropyl-, N-β-hydroxybutyl-, N-γ-hydroxypropyl-, N-γ-hydroxybutyl-, N-β-halogenoethyl-, N-β-halogenopropyl-, N-γ-halogenopropyl- and N-δ-hydroxybutyl-compounds, and their esters with lower alkylsulphonic acids and arylsulphonic acids, such as methanesulphonic acid, ethanesulphonic acid, benzenesulphonic acid or p-toluenesulphonic acid, with hydrogen halides, such as hydrogen chloride, hydrogen bromide and hydrogen iodide, and with chloroformic acid.

Some particularly preferred intermediate products of this nature, such as can easily be prepared from the listed bases VII and be used for the preparation of the bases V, are, for example:

N-β-hydroxyethyl-N-methylaniline, N-β-chloroethyl-N-ethyl-m-toluidine, N-δ-bromobutyl-N-benzyl-m-chloroaniline, N-β-methanesulphonyloxyethyl-N-butyl-m-trifluoromethylaniline, N-β-(4-toluenesulphonyloxy)ethyl-N-methylaniline, N-γ-chloropropyl-N-cyclohexylaniline, N-β-chloroethyl-N-ethyl-m-phenetidine, N-β-chloroethyl-N-methyl-2,5-dimethoxyaniline, N-β-chloroethyl-N-methyl-3-phenoxyaniline, N-β-chloropropyl-N-γ-phenylpropyl-2-methoxy-5-methylaniline, N-β-ethanesulphonyloxyethyl-N-β-phenylpropyl-m-toluidine, N-β-phenylsulphonyloxyethyl-N-propyl-3-ethylaniline, N-β-chloroethyl-N-methyl-m-anisidine, N-β-chloroformyloxyethyl-N-methyl-3-chloroaniline, N-β-chloroethyl-N-propyl-3-benzoylaminoaniline, N-β-bromoethyl-N-cyclopentylaniline, N-β-iodopropyl-N-methyl-3-acetaminoaniline, N-β-chloroformyloxyethyl-N-α-phenylethyl-m-toluidine and N-β-chloroethyl-N-benzyl-2-ethoxy-5butyrylamino-aniline.

Further preferred intermediate products of the formula IX with T=CHO, such as are easily obtainable in one step, and in a multiplicity corresponding to the list of the secondary bases VII, from the hydroxyalkyl compounds XII (T=CHO) by the action of inorganic acid halides or from the compounds XII (T=H) by the Vilsmeier formylation, in a known manner, are, for example:

N-β-chloroethyl-N-methyl-4-aminobenzaldehyde, N-β-chloroethyl-N-butyl-2-methyl-4-aminobenzaldehyde, N-β-chloropropyl-N-benzyl-2-methoxy-4-aminobenzaldehyde, N-γ-chloropropyl-N-α-phenylethyl-2-bromo-4-aminobenzaldehyde, N-δ-chlorobutyl-N-methyl-2,5-dimethoxy-4-aminobenzaldehyde, N-β-chloroethyl-N-β-phenylpropyl-2-chloro-4-aminobenzaldehyde, N-β-chloroethyl-N-methyl-2,5-dichloro-4-aminobenzaldehyde and N-β-chloroethyl-N-ethyl-2-phenoxy-4-aminobenzaldehyde.

The reaction of such compounds IX (T=CHO) and XII (T=CHO) with methylene-active compounds IV leads smoothly, in a known manner, to the desired intermediate products IX

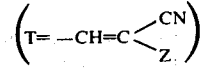

and XII

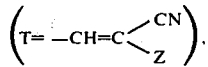

and the reaction of XII (T=CHO and

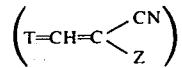

with phosgene further leads to XIII (T=CHO and

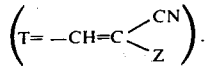

In the case that

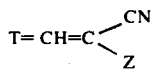

reaction of IX with the phenolates VIII directly gives the styryl dyestuffs I, whilst XII or XIII with chloroformic acid esters XI or phenolates VIII, respectively, give the carbonic acid esters X

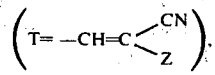

and thermal elimination of carbon dioxide from these also gives the desired styryl dyestuffs I.

Examples of suitable phenols VIII (Me = H), for the preparation of the phenolates VIII, the intermediate products VI and the chloroformic acid esters XI are:

4-propylphenol, 4-isopropylphenol, 4-tert.-butylphenol, 2-tert.-butylphenol, 2-t-butyl-p-cresol, 4-ethyl-2-isopropylphenol, 4-n-amylphenol, 2-ethyl-4-isopropylphenol, 2,5-diethylphenol, 4-hydroxy-3,5-ditert.-butylphenol, 5,6,7,8-tetrahydro-β-naphthol, 1-bromo-5,6,7,8-tetrahydro-β-naphthol, -chloro-3,5-diethylphenol, 4-chloro-5,6,7,8-tetrahydro-α-naphthol, 4-tert.-butyl-1-naphthol, 4-(1,1,3,3-tetramethylbutyl)-phenol, 2,4-di-(1,1,3,3-tetramethylbutyl)-phenol, 4-nonylphenol, 4-laurylphenol, 4-lauryl-2-ethylphenol, 4-cyclopentylphenol, 2-cyclopentylphenol, 4-cyclohexylphenol, 2-cyclohexylphenol, 2-cyclopentyl-4-chlorophenol, 4-(bicyclo[2.2.1]hept-2-yl)-phenol, 2,6-dimethyl-4-cyclohexylphenol, 2-tert.-butyl-4-cyclohexylphenol, 2,4-di(cyclopentyl)-phenol, 2,4,5-tri(cyclopentyl)-phenol, 4-chloro-2-cyclohexylphenol, 2-cyclohexyl-4-tert.-butylphenol, 4-(bicyclo[2.2.1]hept-2-yl)-2-chlorophenol, 2,4-di(cyclopentyl)-5-methylphenol, 4-cyclohexyl-1-naphthol, 2-benzylphenol, 4-benzylphenol, 4-(α,α-dimethylbenzyl)-phenol, 4-benzyl-3,5-dimethylphenol, 4-tert.-butyl-2-benzylphenol, 4-benzyl-1-naphthol, 4-(4-chlorobenzyl)-phenol, 4-(4'-methylbenzyl)-2-ethylphenol,4-(3',4'-dichlorobenzyl)-phenol, 4-hydroxy-stilbene, 4-hydroxy-dibenzyl, 2-benzyl-4-chlorophenol, 2-isopropyl-4-methylmercapto-phenol, 2-methyl-4-n-butylmercaptophenol, 2-cyclopentyl-4-ethylmercapto-phenol, 2-benzyl-4-isopropylmercapto-phenol, 4-phenylmercapto-phenol, 3,4'-dimethyl-4-hydroxy-diphenyl thioether, 2-bromo-4-benzylmercapto-phenol, 2-ethyl-4-cyclohexylmercapto-phenol, 3,5-dimethyl-4-methylmercapto-phenol, 3,5-dimethyl-4-propylmercapto-phenol, 3',4'-dichloro-4-hydroxy-diphenyl thioether, 2',4'-dichloro-5'-methyl-4-hydroxy-diphenyl thioether, 2',4'-dichloro-4-hydroxydiphenyl thioether, 3-tert.-butyl-4'-chloro-4-hydroxy-diphenyl thioether, 4-(α-naphthylmercapto)-phenol, 3-methyl-4-(β-naphthylmercapto)-phenol, 3-ethyl-2',4',5'-trichloro-4-hydroxydiphenyl thioether, 4-(5,6,7,8-tetrahydronaphth-2-ylmercapto)-phenol, 4-(α-naphthylmethylmercapto)-phenol, 2',3',4',5',6'-pentachloro-4-hydroxy-diphenyl thioether, 2-phenyl-4'-tert.-butyl-4-hydroxy-diphenyl thioether, 2-phenoxy-4-ethylmercaptophenol, 4-hydroxy-4'-benzyl-diphenyl thioether, 4-hydroxy-4'-phenoxy-diphenyl thioether, 4-hydroxy-4'-phenyl-diphenyl thioether, 4-hydroxy-4'-cyclohexyl-diphenyl thioether, 4-(benzthiazol-2-ylmercapto)-phenol, 4-(6-methylbenzthiazol-2-ylmercapto)-phenol, 4-(6-cyclohexylbenzthiazol-2-ylmercapto)-phenol, 4-(6-ethoxybenzthiazol-2-ylmercapto)-phenol, 4-(benzoxazol-2-ylmercapto)-phenol, 4-(naphth[1.2-d]thiazol-2-ylmercapto)-phenol, 2,3,4,6-tetrachlorophenol, 2,4,5,6-tetrachloro-m-cresol and pentachlorophenol.

The dyestuffs according to the invention are outstandingly suitable for dyeing and printing hydrophobic fibre materials, especially polyesters, for example from terephthalic acid and ethylene glycol or 1,4-bis(hydroxymethyl)-cyclohexane, polycarbonates, for example those from α,α-dimethyl-4,4'-dihydroxy-diphenylmethane and phosgene, cellulose esters, for example cellulose triacetate, and fibres based on polyvinyl chloride.

The dyestuffs are used according to the known dyeing processes, for example by the exhaustion process as aqueous dispersions in the presence of customary dispersing agents and optionally in the presence of customary carriers at temperatures near 100°C, or without carriers at 120°-140°C (HT process). They are furthermore outstandingly suitable for dyeing by the known thermosol process. They do not dye, or only dye slightly, wool and cotton simultaneously present in the dye bath, so that they can readily be used for dyeing polyester/wool and polyester/cellulose fibre mixed fabrics. They display excellent solubility in numerous organic solvents and can be used for the bulk dyeing of lacquers, oils and plastics, such as polystyrene and polyethylene, and for dyeing fibres by the customary spin dyeing processes.

The dyestuffs according to the invention impart clear yellow dyeings of vary good fastness to light and good fastness to washing and sublimation to the hydrophobic materials mentioned. They can be used for combined dyeing with blue azo and anthraquinone disperse dyestuffs and in that case give green dyeings of very good fastness to light, which do not show any "catalytic fading", on cellulose triacetate and on polyester.

The good stability in the dye bath, and stability to boiling of the dyestuffs according to the invention in neutral to moderately basic liquors or printing pastes (pH stability up to approx. pH 10) should be singled out particularly and as a result the dyestuffs are also well suited to one-bath dyeing (thermosol-thermofixing process) and printing of polyester/cotton mixed fabrics in combination with reactive dyestuffs which require the presence of alkali (sodium carbonate and sodium bicarbonate). In the examples which follow, parts denote parts by weight unless expressly stated otherwise; they bear the same relationship to parts by volume as does the gram to the milliliter. The temperatures quoted are to be understood as degrees Centigrade. The structures of the dyestuffs shown were in all cases confirmed by mass spectrographs and the molecular weights determined corresponded to the calculated molecular weights.

EXAMPLE 1

39.5 Parts of the aldehyde of the formula

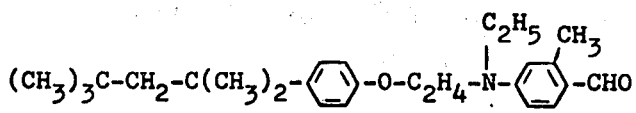

6.5 parts of malodinitrile and 0.5 part of piperidine in 300 parts by volume of methanol are heated to the boil for 3 hours. The styryl dyestuff of the formula

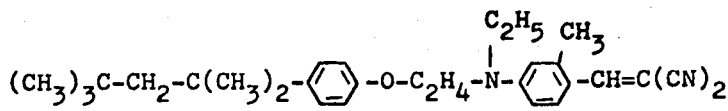

which separates out in the form of a red crystal powder is filtered off after the mixture has cooled to room temperature and is washed with methanol. 42 parts of dyestuff melting at 149.5°–151° after recrystallisation from 400 parts by volume of butanol are obtained; the dyestuff dyes polyester fibres and triacetate rayon in clear greenish-tinged yellow shades of very good fastness to light, wet processing and sublimation.

The use of equivalent amounts of cyanoacetic acid methyl ester, cyanoacetic acid n-butyl ester, cyanoacetic acid benzyl ester, cyanoacetic acid γ-phenylpropyl ester or cyanoacetic acid β-(p-tolyl)-ethyl ester in place of malodinitrile in the preceding example gives the dyestuffs of the above formula in which one of the nitrile groups is replaced by the corresponding carboxylic acid ester group. To avoid transesterification reactions during the process of preparation or recrystallisation of the dyestuffs it is preferable to work in the corresponding alcohols at 50°–100° or in inert solvents (toluene, dioxane or acetonitrile), to distil off the solvents, if necessary, after the reaction has taken place, and to recrystallise the dyestuffs from inert solvents (toluene/cyclohexane or methylcyclohexane). The dyestuffs obtained possess similar tinctorial properties to the malodinitrile dyestuff.

The aldehyde employed for the preparation of the dyestuffs is obtained as follows:

5 Parts of sodium are dissolved in 300 parts by volume of absolute ethanol, 45 parts of 4-(1',1',3',3'-tetramethylbutyl)-phenol (melting point 83°–84°), followed by 39.5 parts of N-ethyl-N-β-chloroethyl-m-toluidine, are added, and the mixture is heated to the boil under reflux for approx. 6 hours. After this, the β-chloroethyl compound can at most still be detected in traces by thin layer chromatography. The sodium chloride which has separated out is filtered off and washed with a little ethanol or chloroform, and the filtrate is freed from the solvent as completely as possible by distillation — ultimately in vacuo. The pasty residue (70 parts) which remains is dissolved in 40 parts of dimethylformamide and 37 parts of phosphorus oxychloride are added dropwise whilst stirring and ensuring, through cooling, that the temperature does not rise significantly above 60°. To complete the Vilsmeier formylation, the mixture is stirred for a further 10 hours at 50°–60°, diluted with 150 parts by volume of chlorobenzene, decomposed by adding ice water and rendered alkaline with concentrated sodium hydroxide solution. The organic phase is separated off and washed with water and the aldehyde is obtained as a brownish, viscous residue (66.5 parts) by distilling off the solvent in vacuo.

The same aldehyde is also obtained directly if instead of the N-ethyl-N-β-chloroethyl-m-toluidine used above the N-ethyl-N-β-chloroethyl-4-amino-2-methylbenzaldehyde directly obtainable by Vilsmeier reaction from N-ethyl-β-hydroxyethyl-m-toluidine is employed and, for example, the following procecure is adopted:

45 Parts of 4-(1',1',3',3'-tetramethylbutyl)-phenol and 45 parts of the aldehyde just mentioned are added to a solution of 5 parts of sodium in 300 parts by volume of absolute ethanol and the mixture is heated to the refluxing temperature for several hours, until the β-chloroaldehyde is no longer detectable chromatographically. The sodium chloride which has precipitated is then removed by filtration and the desired aldehyde is isolated from the filtrate by distilling off the solvent. In the form in which it is obtained, the adlehyde is sufficiently pure for the reaction with malodinitrile, cyanoacetic acid derivatives and acetonitrile derivatives to give the corresponding styryl dyestuffs.

The table which follows describes, in further examples, dyestuffs according to the invention which are obtained analogously to Example 1 from the stated aldehydes and malodinitrile, cyanoacetic acid derivatives or acetonitrile derivatives, and in addition mentions the colour shade of the particular styryl dyestuff on polyester fibres and cellulose triacetate fibres.

| Example No. | Aldehyde | $H_2C\begin{matrix}CN\\Z\end{matrix}$  Z = | Colour shade |
|---|---|---|---|
| 2 | 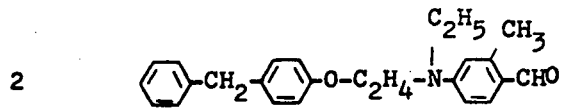 | CN | greenish-tinged yellow |
| 3 | 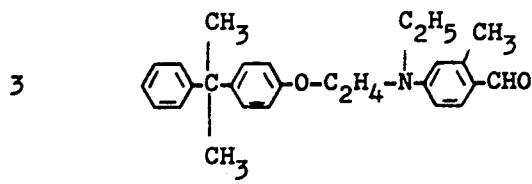 | CN | " " |

-Continued

| Example No. | Aldehyde | $H_2C\underset{Z}{\overset{CN}{\diagdown}}$ Z = | Colour shade |
|---|---|---|---|
| 4 | Ph-S-C$_6$H$_4$-O-C$_2$H$_4$-N(C$_2$H$_5$)-C$_6$H$_3$(CH$_3$)-CHO | CN | " " |
| 5 | (CH$_3$)$_3$C-CH$_2$-C(CH$_3$)$_2$-C$_6$H$_4$-O-C$_2$H$_4$-N(C$_2$H$_5$)-C$_6$H$_3$(Cl)-CHO | CN | " " |
| 6 | (CH$_3$)$_3$C-C$_6$H$_4$-O-C$_2$H$_4$-N(C$_2$H$_5$)-C$_6$H$_3$(CH$_3$)-CHO | CN | greenish-tinged yellow |
| 7 | [2-C(CH$_3$)$_3$-C$_6$H$_4$]-O-C$_2$H$_4$-N(C$_2$H$_5$)-C$_6$H$_3$(CH$_3$)-CHO | CN | " " |
| 8 | (CH$_3$)$_3$C-C$_6$H$_3$[C(CH$_3$)$_3$]-O-C$_2$H$_4$-N(C$_2$H$_5$)-C$_6$H$_3$(CH$_3$)-CHO | CN | " " |
| 9 | (cyclohexyl)-C$_6$H$_4$-O-C$_2$H$_4$-N(C$_2$H$_5$)-C$_6$H$_3$(CH$_3$)-CHO | CN | " " |
| 10 | (cyclohexyl)-C$_6$H$_4$-C$_6$H$_4$-O-C$_2$H$_4$-N(C$_2$H$_5$)-C$_6$H$_3$(CH$_3$)-CHO | CN | greenish-tinged yellow |
| 11 | CH$_3$-C$_6$H$_4$-C(CH$_3$)$_2$-C$_6$H$_4$-O-C$_2$H$_4$-N(C$_2$H$_5$)-C$_6$H$_3$(CH$_3$)-CHO | CN | " " |
| 12 | (cyclohexyl)-C$_6$H$_4$-C$_6$H$_4$-O-C$_2$H$_4$-N(C$_2$H$_5$)-C$_6$H$_3$(CH$_3$)-CHO | COOC$_4$H$_9$(n) | " " |

-Continued

| Example No. | Aldehyde | $H_2C\underset{Z}{\overset{CN}{\diagdown}}$ Z = | Colour shade |
|---|---|---|---|
| 13 | 4-(cyclobutylmethyl-substituted)-3-methylphenoxyethyl-N-ethyl-N-(3-methyl-4-formylphenyl)amine [H₂C(CH₂)₂CH-CH₂-C₆H₃(CH₃)-O-C₂H₄-N(C₂H₅)-C₆H₃(CH₃)-CHO] | CN | " " |
| 14 | $C_2H_5$-C₆H₃[C(CH₃)₃]-O-C₂H₄-N(C₂H₅)-C₆H₃(CH₃)-CHO | CN | greenish-tinged yellow |
| 15 | (cyclohexyl)-C₆H₃(CH₃)-O-C₂H₄-N(C₂H₅)-C₆H₃(CH₃)-CHO | CN | " " |
| 16 | C₆H₄(CH₂-C₆H₅)-O-C₂H₄-N(C₂H₅)-C₆H₃(CH₃)-CHO | CN | " " |
| 17 | C₆H₄(CH₂-C₆H₅)-O-C₂H₄-N(C₂H₅)-C₆H₃(CH₃)-CHO | COOCH₂C₆H₅ | greenish-tinged yellow |
| 18 | (CH₃)₃C-C₆H₃(CH₂C₆H₅)-O-C₂H₄-N(C₂H₅)-C₆H₃(CH₃)-CHO | CN | " " |
| 19 | (CH₃)₃C-C₆H₂(Cl)(Cl)-O-C₂H₄-N(C₂H₅)-C₆H₃(OC₂H₅)-CHO | CN | " " |
| 20 | CH₃-C₆H₃(CH₂C₆H₅)-O-C₂H₄-N(C₄H₉(n))-C₆H₄-CHO | CN | " " |
| 21 | CH₃-C₆H₄-S-C₆H₃(CH₃)-O-C₂H₄-N(C₂H₅)-C₆H₃(CH₃)-CHO | CN | greenish-tinged yellow |

| Example No. | Aldehyde | 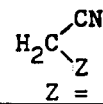 Z = | Colour shade |
|---|---|---|---|
| 22 | 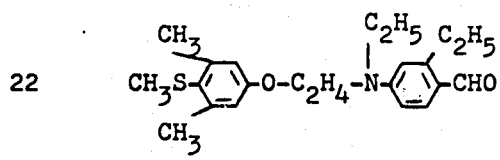 | CN | |
| 23 | 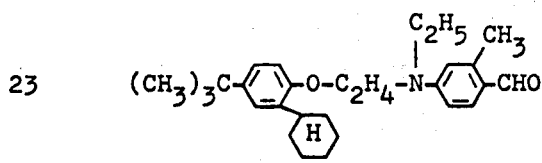 | CN | " " |
| 24 | 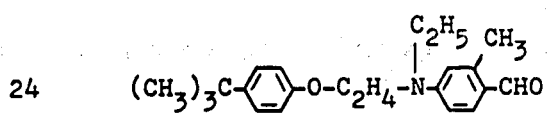 | COO-CH$_2$-CH$_2$-C$_6$H$_5$ | " " |
| 25 | 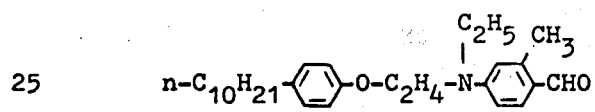 | CN | greenish-tinged yellow |
| 26 | 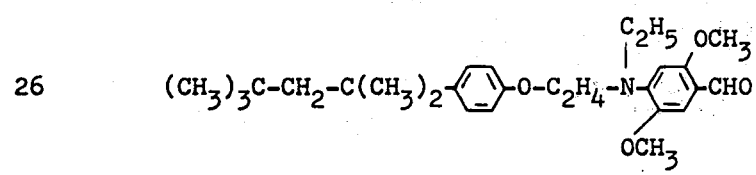 | CN somewhat | " " |
| 27 | 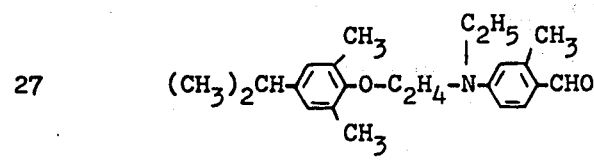 | CN | " " |
| 28 | 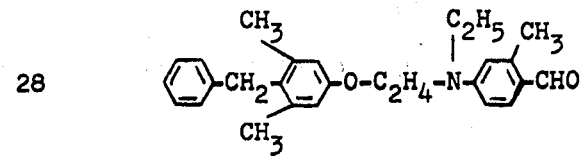 | CN | " " |
| 29 | 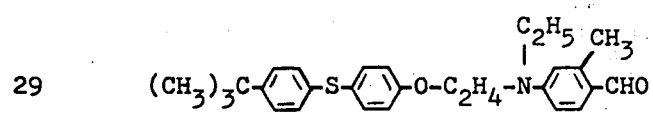 | CN | greenish-tinged yellow |
| 30 | 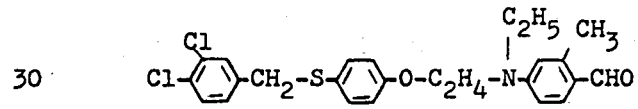 | CN | " " |
| 31 | 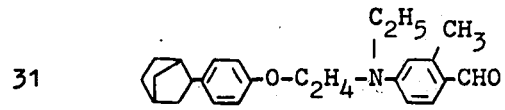 | CN | " " |

-Continued

| Example No. | Aldehyde | $H_2C{<}^{CN}_{Z}$ Z = | Colour shade |
|---|---|---|---|
| 32 | ![structure] cyclohexyl-phenyl-O-C₂H₄-N(C₂H₅)-C₆H₃(CH₃)-CHO with cyclohexyl substituent | CN | " " |
| 33 | CH₃, cyclohexyl-phenyl(CH₃)-O-C₂H₄-N(C₂H₅)-C₆H₃(CH₃)-CHO with cyclohexyl | CN | " " |
| 34 | PhCH₂-naphthyl-O-C₂H₄-N(C₂H₅)-C₆H₃(CH₃)-CHO | CN | greenish-tinged yellow |
| 35 | cyclohexyl-phenyl-O-C₂H₄-N(C₂H₅)-C₆H₃(CH₃)-CHO, C(CH₃)₃ | CN | " " |
| 36 | (Cl,Cl-C₆H₃)-S-C₆H₄-O-C₂H₄-N(C₂H₅)-C₆H₃(CH₃)-CHO | CN | " " |
| 37 | PhCH₂-O-C₆H₄-C(CH₃)₂-C₆H₄-O-C₂H₄-N(C₂H₅)-C₆H₃(CH₃)-CHO | CN | " " |
| 38 | cyclohexyl-C₆H₃(CH₃)-O-C₂H₄-N(C₂H₅)-C₆H₃(CH₃)-CHO | COOC₂H₅ | greenish-tinged yellow |
| 39 | n-C₁₂H₂₅-C₆H₄-O-C₂H₄-N(C₂H₅)-C₆H₃(CH₃)-CHO | CN | " " |
| 40 | cyclohexyl-C₆H₂(Cl,Cl)-O-C₂H₄-N(C₂H₅)-C₆H₃(CH₃)-CHO | CN | " " |
| 41 | Cl-C₆H₂(C₂H₅,C₂H₅)-O-C₂H₄-N(C₂H₅)-C₆H₃(CH₃)-CHO | CN | " " |

—Continued

| Example No. | Aldehyde | $H_2C\begin{smallmatrix}CN\\Z\end{smallmatrix}$ Z = | Colour shade |
|---|---|---|---|
| 42 | (CH₃)₃C-⟨⟩-O-C₂H₄-N(C₆H₁₁)-⟨⟩-CHO | CN | " " |
| 43 | ⟨C₆H₁₁⟩-S-⟨⟩-O-C₂H₄-N(C₂H₅)-⟨⟩(CH₃)-CHO | CN | greenish-tinged yellow |
| 44 | ⟨benzothiazol-2-yl⟩-S-⟨⟩-O-C₂H₄-N(CH₃)-⟨⟩-CHO | CN | " " |
| 45 | (CH₃)₃C-⟨⟩(CH₃)-O-C₂H₄-N(C₂H₅)-⟨⟩-CHO | COC₆H₅ | " " |
| 46 | (CH₃)₂CH-⟨⟩(C₂H₅)-O-C₂H₄-N(CH₃)-⟨⟩(CH₃)-CHO | CN | " " |
| 47 | ⟨C₆H₁₁⟩-⟨⟩-O-C₂H₄-N(C₂H₅)-⟨⟩(OC₂H₅)(OC₂H₅)-CHO | CN slightly " | " |
| 48 | (CH₃)₃C-⟨⟩-O-C₂H₄-N(C₂H₅)-⟨⟩(CH₃)-CHO | CONH-⟨naphthyl⟩ | greenish-tinged yellow |
| 49 | (CH₃)₂CH-⟨⟩(Cl)(CH₃)-O-C₂H₄-N(C₆H₁₁)-⟨⟩(CH₃)-CHO | CN | " " |
| 50 | ⟨C₆H₁₁⟩-⟨⟩-O-C₂H₄-N(C₂H₅)-⟨⟩(CF₃)-CHO | CN | " " |
| 51 | ⟨C₆H₁₁⟩-⟨⟩(C(CH₃)₃)-O-C₂H₄-N(C₂H₄CN)-⟨⟩(CH₃)-CHO | CN | " " |

– Continued

| Example No. | Aldehyde | $H_2C<^{CN}_{Z}$ — Z = | Colour shade |
|---|---|---|---|
| 52 | HO-[3,5-di-C(CH₃)₃-phenyl]-O-C₂H₄-N(C₂H₅)-[3-CH₃-phenyl]-CHO | CN | " " |
| 53 | Cl-[3,5-di-CH₃-phenyl]-O-C₂H₄-N(CH₃)-[3-CH₃, 4-NHCOC₆H₅-phenyl]-CHO | CN | greenish-tinged yellow |
| 54 | C₆H₅-C₂H₄-[phenyl]-O-C₂H₄-N(C₂H₅)-[3-CH₃-phenyl]-CHO | CN | " " |
| 55 | n-C₄H₉-S-[3,5-di-CH₃-phenyl]-O-C₂H₄-N(C₂H₅)-[3-CH₃-phenyl]-CHO | CN | " " |
| 56 | cyclohexyl-[phenyl]-O-C₂H₄-N(CH₃)-[3-OC₆H₅-phenyl]-CHO | CN | " " |
| 57 | (CH₃)₃C-CH₂-C(CH₃)₂-[phenyl]-O-C₂H₄-N(C₂H₅)-[3-CH₃-phenyl]-CHO | COO-cyclohexyl | " " |
| 58 | C₆H₅-CH₂-[phenyl]-O-C₂H₄-N(C₂H₅)-[3-CH₃-phenyl]-CHO | CON(CH₃)-CH₂C₆H₅ | greenish-tinged yellow |
| 59 | cyclohexyl-[3-C(CH₃)₃-phenyl]-O-C₂H₄-N(C₂H₅)-[3-CH₃-phenyl]-CHO | CO-N(pyrrolidinyl) | greenish-tinged yellow |
| 60 | Cl₅-[phenyl]-S-[phenyl]-O-C₂H₄-N(C₂H₅)-[3-CH₃-phenyl]-CHO | CN | " " |
| 61 | (CH₃)₃C-[phenyl]-O-C₂H₄-N(C₂H₅)-[3-CH₃-phenyl]-CHO | COOCH₂-[2,4,6-tri-Cl-phenyl] | |

| Example No. | Aldehyde | $H_2C\overset{CN}{\underset{Z}{\diagdown}}$ Z = | Colour shade |
|---|---|---|---|
| 62 | 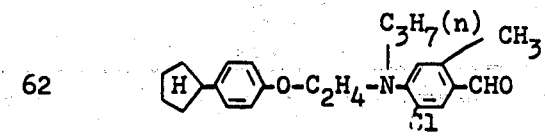 | CN | " " |
| 63 | 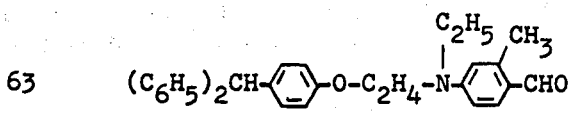 | CN | greenish-tinged yellow |
| 64 | 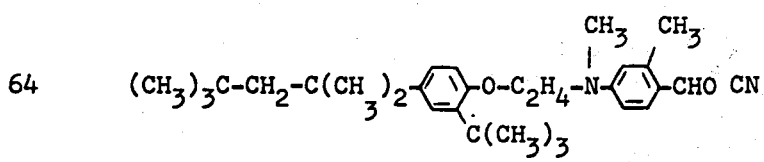 | CN | " " |
| 65 | 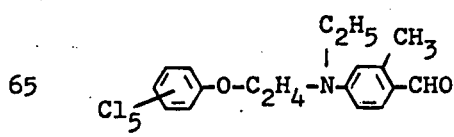 | CN | " " |

EXAMPLE 66

28.8 Parts of the azomethine of the formula

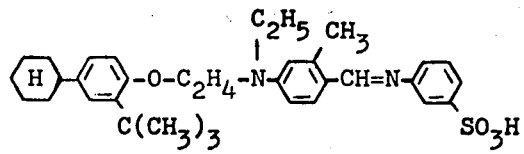

and 3.5 parts of malodinitrile in 300 parts by volume of methanol are heated to the boil for 3 hours, with addition of 2 parts of piperidine. After cooling, 21 parts of the methine dyestuff are isolated; after recrystallisation from ethanol, this dyestuff melts at 135°–136° and corresponds to the dyestuff of Example 35 according to a mixed melting point and molecular weight determined by mass spectrometry (calculated and found, 469). The same dyestuff is obtained starting from azomethines which instead of being derived from metanilic acid are derived from sulphanilic acid, anthranilic acid or aniline. The azomethines are prepared analogously to the instructions in U.S. Pat. No. 2,583,551 (Example 17), starting from N-ethyl-N-β-(2-tert.-butyl-4-cyclohexylphenoxy)ethyl-m-toluidine by reaction with formaldehyde and nitrobenzene or nitrobenzenesulphonic acids or nitrobenzoic acids in the presence of iron and hydrochloric acid.

The dyestuff possesses good stability to boiling and dyes fibres of polyglycol terephthalate and cellulose triacetate in greenish-tinged yellow shades having very good fastness properties.

EXAMPLE 67

25 Parts of the dry sodium salt of 4-(α,α-dimethylbenzyl)-phenol and 27.5 parts of the β-chloroethyl dyestuff of the formula

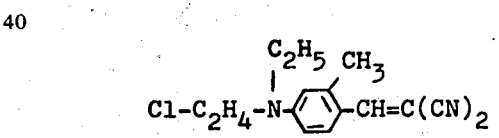

in 400 parts by volume of dry chlorobenzene are heated to 120°–130° (approx. 4 hours) until the β-chloroethyl compound has been converted completely. After cooling, the solution is washed with water and dried and the solvent is distilled off in vacuo. The residue is recrystallised from butanol with the addition of fuller's earth and gives the dyestuff according to Example 3, which melts at 122°–124°. This dyestuff gives brilliant greenish-tinged yellow dyeings of very good fastness to light and to sublimation on polyester materials and cellulose triacetate materials and is distinguished by good stability to boiling in the dye bath.

The same dyestuff is obtained by eliminating the water, by azeotropic distillation, from a mixture of 22.3 parts of p-cumylphenol (4-(α,α-dimethylbenzyl)-phenol) and 11.8 parts of 50 per cent strength potassium hydroxide solution with 400 parts by volume of chlorobenzene, then adding 27.5 parts of the above β-chloroethyl dyestuff and proceeding further as above.

It can be seen that using the procedures mentioned and varying the phenolate component or the phenol component and the chloroethyl component, and especially also by replacing them by the chloropropyl or bromopropyl and chlorobutyl or bromobutyl component, a multiplicity of new dyestuffs according to the invention can be obtained. Of the dyestuffs prepared in this way, there will here first be mentioned those which have also been obtained by other methods and are already known through Examples 1, 2, 6, 10, 13, 29 and 47. Further examples are shown in the list which fillows, which indicates the colour shade obtained on dyeing polyester materials.

| Example No. | Dyestuff | Colour shade |
|---|---|---|
| 68 | $(CH_3)_3C-\langle\rangle(CH_3)-O-(CH_2)_3-N(C_2H_5)-\langle\rangle-CH=C(CN)_2$ | greenish-tinged yellow |
| 69 | $H-\langle\rangle-\langle\rangle(C(CH_3)_3)-O-(CH_2)_4-N(CH_3)-\langle\rangle(CH_3)-CH=C(CN)_2$ | " " |
| 70 | $H-\langle\rangle-\langle\rangle(CH_3)-O-CH(CH_2)_2-N(C_2H_5)-\langle\rangle(CH_3)-CH=C(CN)_2$ | " " |
| 71 | $Cl-\langle\rangle-S-\langle\rangle-O-(CH_2)_3-N(C_2H_5)-\langle\rangle(Cl)-CH=C(CN)_2$ | " " |
| 72 | $(CH_3)_3C-\langle\rangle(Cl,Cl)-O-C_2H_4-N(C_2H_5)-\langle\rangle(OCH_3, OCH_3)-CH=C(CN)_2$ | slightly " " |
| 73 | $Cl-\langle\rangle(Cl,Cl,Cl,CH_3)-O-C_2H_4-N(C_2H_5)-\langle\rangle(CH_3)-CH=C(CN)_2$ | greenish-tinged yellow |
| 74 | $\langle\rangle-CH_2-\langle\rangle(\text{naphthyl})-O-C_2H_4-N(CH_3)-\langle\rangle-CH=C(CN)_2$ | " " |

EXAMPLE 75

30 Parts of 4-(β-bromoethoxy)-cyclohexylbenzene and 13.5 parts of N-ethyl-m-toluidine in 250 parts by volume of toluene, with the addition of 15 parts of finely powdered anhydrous potassium carbonate, are heated to the reflux temperature for approx. 8–10 hours. As soon as a thin layer chromatogram indicates practically complete conversion of the N-ethyl-m-toluidine, the reaction mixture is allowed to run into dilute sodium hydroxide solution. After washing and drying the toluene solution, and removing the solvent by distillation, a dark oil is obtained, which can be purified by vacuum distillation (boiling point 199°–200°/0.2 mm Hg). The resulting water-clear N-ethyl-N-β-(4-cyclohexylphenoxy)ethyl-m-toluidine is formylated by the Vilsmeier method in the manner described under Example 1 and the styryl dyestuff is thus obtained via the crude aldehyde and its condensation with malodinitrile; the dyestuff crystallises from ethanol/fuller's earth in orange needles of melting point 112°–114°. According to a mixed melting point and examination by mass spectrometry (molecular weight, calculated and found:

413), the dyestuff is identical with the dyestuff of Example 10.

The 4-(β-bromoethoxy)-cyclohexylphenol used was obtained in a manner which is in itself known by reaction of 1,2-dibromoethane with 4-cyclohexylphenol in aqueous sodium hydroxide solution (compare German Auslegeschrift (German Published Specification) 1,443,216). If instead of 4-(β-bromoethoxy)-cyclohexylbenzene, 4-(γ-bromopropoxy)-cyclohexylbenzene, which is easily obtainable from 1,3-dibromopropane and 4-cyclohexylphenol, or 4-(δ-chlorobutoxy)-cyclohexylbenzene, which is obtainable from 4-chlorobutyl bromide and 4-cyclohexylphenol, is used, homologous dyestuffs are obtained, the base component of which can be varied through choice of the secondary amine. Further new dyestuffs according to the invention become obtainable through the use of other phenols. Some examples are listed below, mentioning the colour shade achieved when they are used to dye polyester materials:

| Example | Dyestuff | Colour shade |
|---|---|---|
| 76 | $(H)\langle\rangle\text{-O-}(CH_2)_3\text{-N}(C_2H_5)\text{-}\langle CH_3\rangle\text{-CH=C}(CN)_2$ | greenish-tinged yellow |
| 77 | $(H)\langle\rangle\text{-O-}(CH_2)_4\text{-N}(C_2H_5)\text{-}\langle CH_3\rangle\text{-CH=C}(CN)_2$ | " " |
| 78 | $(H)\langle\rangle\text{-O-}(CH_2)_3\text{-N}(CH_2\text{-}C_6H_5)\text{-}\langle\rangle\text{-CH=C}(CN)_2$ | " " |
| 79 | $(H)\langle\rangle\text{-O-}(CH_2)_4\text{-N}(C_2H_5)\text{-}\langle OCH_3, OCH_3\rangle\text{-CH=C}(CN)_2$ | Slightly " " |
| 80 | $(H)\langle\rangle\text{-O-}(CH_2)_3\text{-N}(CH_3)\text{-}\langle Cl\rangle\text{-CH=C}(CN)_2$ | " " |
| 81 | $(H)\langle\rangle\text{-O-}(CH_2)_3\text{-N}(CH_3)\text{-}\langle C(CH_3)_3\rangle\text{-CH=C}(CN)_2$ | greenish-tinged yellow |
| 82 | $\langle\rangle\text{-CH}_2\text{-}\langle\rangle\text{-O-}(CH_2)_4\text{-N}(C_2H_5)\text{-}\langle CH_3\rangle\text{-CH=C}(CN)_2$ | " " |
| 83 | $\langle\rangle\text{-S-}\langle\rangle\text{-O-}(CH_2)_3\text{-N}(C_2H_5)\text{-}\langle CH_3\rangle\text{-CH=C}(CN)_2$ | " " |
| 84 | $(CH_3)_3C\text{-}CH_2\text{-}C(CH_3)_2\text{-}\langle\rangle\text{-O-}(CH_2)_4\text{-N}(C_2H_5)\text{-}\langle CH_3\rangle\text{-CH=C}(CN)_2$ | " " |

EXAMPLE 85

24 Parts of chloroformic acid 4-cyclohexylphenyl ester and 16.5 parts of N-ethyl-N-β-hydroxyethyl-aniline in 500 parts by volume of dry benzene, with the addition of 15 parts of finely powdered potassium carbonate, are heated for several hours under reflux, until the hydroxyethyl compound has been converted. The inorganic salts are separated off by filtration and the solvent is removed by distillation. The carbonic acid ester of the formula

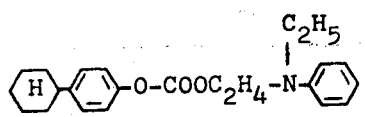

which remains as an oily residue is heated in a water pump vacuum whilst gradually raising the temperature to approx. 200°, until the elimination of carbon dioxide which already starts above 100° has ended. The crude product can be purified by distillation (boiling point 191°–192°/0.25 mm Hg), but can also be converted further in the unpurified form. The reaction of the resulting N-ethyl-N-β-(4-cyclohexylphenoxy)ethyl-aniline with phosphorus oxychloride and dimethylformamide to give the aldehyde, and the condensation with malodinitrile, take place in the manner already described. The dyestuff of the formula

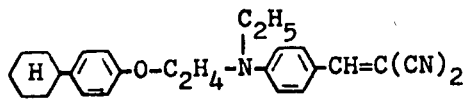

is obtained as a yellow powder which after recrystallisation from ethanol with addition of fuller's earth melts at 106°–107°.

The dyestuff is very suitable for dyeing polyester materials and cellulose triacetate materials in clear greenish-tinged yellow shades which have very good fastness to light, wet processing and sublimation.

EXAMPLE 86

Analogously to the preceding example, 21.5 parts of chloroformic acid 4-tert.-butylphenyl ester and 17.9 parts of N-ethyl-N-β-hydroxyethyl-m-toluidine give the mixed carbonic acid ester, and on thermally eliminating carbon dioxide therefrom N-ethyl-N-β-(4-tert.-butylphenoxy)-ethyl-m-toluidine is obtained as a colourless oil of boiling point 183°–184°/0.7 mm Hg. Further reaction of the product with Vilsmeier reagent in the manner described in Example 1, and then with malodinitrile, leads, via the aldehyde, to the styryl dyestuff of the formula

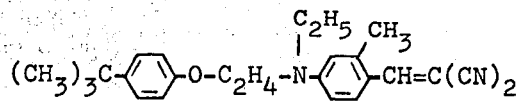

which can be further purified by recrystallisation from butanol and then melts at 102°–104°.

If instead of the abovementioned starting materials, sodium 4-tert.-butylphenol and the chloroformic acid ester of N-ethyl-N-β-hydroxyethyl-m-toluidine are used as starting materials, the same mixed carbonic acid ester, and ultimately the same dyestuff, are obtained.

EXAMPLE 87

190 Parts of sodium 4-cyclohexyl phenolate are added in portions to 170 parts of N-ethyl-N-β-chloroethyl-m-toluidine whilst stirring at 100°–130°. The mixture is then stirred for a further 1–2 hours at 120°–125°, after which at most traces of the β-chloroethyl compound remain detectable by thin layer chromatography. The temperature is lowered to 80°–90°, 220 parts of dimethylformamide are added to the brownish melt, and 180 parts of phosphorus oxychloride are added dropwise at 40°–60°. The mixture is stirred for a further 10–15 hours at 50°–60° and excess Vilsmeier reagent and the aldimonium salts present are decomposed by addition of 800 parts by volume of methanol at 40°–60°. The pH value of the mixture is then adjusted to 6.5–8.5 by dropwise addition of approx. 300 parts by volume of concentrated aqueous ammonia whilst cooling, 60 parts of malodinitrile are added and the mixture is warmed to 60°–75° for 2–3 hours, whilst stirring. The resulting methine dyestuff may first be obtained as an oil, but crystallises out on seeding or on allowing the mixture to cool whilst stirring, and is washed in the usual manner with methanol and then thoroughly with water. The dyestuff melts at 108°–112° and can be purified further by recrystallisation from ethanol (orange needles of melting point 112°–114°). It is identical in physical and tinctorial properties with the dyestuff according to Example 10.

On using sodium 2-cyclohexyl phenolate, the methine dyestuff of Example 9 is obtained, which melts at 149°–153° in the crude form and at 153°–155° after recrystallisation from butanol.

The dyestuffs listed below were also prepared in accordance with the above procedure, in which the sodium salt or potassium salt of the particular phenol is also advantageously prepared from sodium hydroxide solution or potassium hydroxide solution and the phenol in chlorobenzene, with elimination of water from the system. In addition, the colour shade of the dyeings obtained with these dyestuffs on polyester materials and cellulose triacetate materials is shown:

| Example No. | Dyestuff | Colour shade |
|---|---|---|
| 88 | C6H11-C6H4-O-C2H4-N(CH2-C6H5)-C6H3(CH3)-CH=C(CN)2 | greenish-tinged yellow |
| 89 | C6H5-CH2-C6H4-O-C2H4-N(CH2-C6H5)-C6H3(CH3)-CH=C(CN)2 | " " |
| 90 | C6H5-CH2-C6H3(C(CH3)3)-O-C2H4-N(CH2-C6H4-CH3(p))-C6H4-CH=C(CN)2 | " " |
| 91 | (CH3)3C-C10H4(C(CH3)3)-O-C2H4-N(CH3)-C6H4-CH=C(CN)2 | " " |
| 92 | C6H5-CH2-C6H2(CH3)2-O-C2H4-N(CH2-C6H4-C(CH3)3(p))-C6H4-CH=C(CN)2 | greenish-tinged yellow |
| 93 | C6H11-C6H2(Cl)2-O-C2H4-N(CH2-CH(CH3)-C6H5)-C6H3(CH3)-CH=C(CN)2 | " " |
| 94 | (CH3)3C-C6H3(CH2-C5H9)-O-C2H4-N(CH(CH3)-C6H5)-C6H3(OCH3)-CH=C(CN)2 | " " |
| 95 | (CH3)2CH-C6H3(C2H5)-O-C2H4-N((CH2)3-C6H5)-C6H4-CH=C(CN)2 | " " |
| 96 | (CH3)3C-C6H4-O-C2H4-N((CH2)3-C6H5)-C6H3(CH3)-CH=C(CN)2 | greenish-tinged yellow |

-Continued

| Example No. | Dyestuff | Colour shade | |
|---|---|---|---|
| 97 | C$_6$H$_5$-S-C$_6$H$_4$-O-C$_2$H$_4$-N(C$_6$H$_3$(C$_2$H$_5$))-CH=C(CN)$_2$; N-substituent: (CH$_2$)$_2$-C$_6$H$_5$ | " | " |
| 98 | (H)C$_6$H$_{10}$-C$_6$H$_3$((H)C$_5$H$_9$)-O-C$_2$H$_4$-N(C$_6$H$_4$)-CH=C(CN)$_2$; N-substituent: CH$_2$-C$_6$H$_5$ | " | " |
| 99 | (C$_2$H$_5$)(CH$_3$)CH-C$_6$H$_3$(CH(CH$_3$)(C$_2$H$_5$))-O-C$_2$H$_4$-N(C$_2$H$_5$)-C$_6$H$_3$(CH$_3$)-CH=C(CN)$_2$ | " | " |
| 100 | (CH$_3$)$_2$CH-C$_6$H$_3$(CH(CH$_3$)$_2$)-O-C$_2$H$_4$-N(C$_6$H$_3$(CH$_3$))-CH=C(CN)$_2$; N-substituent: (CH$_2$)$_3$-C$_6$H$_5$ | greenish-tinged yellow | |
| 101 | C$_6$H$_5$-CH$_2$-S-C$_6$H$_2$(CH$_3$)$_2$-O-C$_2$H$_4$-N(C$_6$H$_3$(CH$_3$))-CH=C(CN)$_2$; N-substituent: (CH$_2$)$_3$-C$_6$H$_5$ | " | " |
| 102 | (H)C$_6$H$_{10}$-C$_6$H$_4$-O-C$_2$H$_4$-N(C$_6$H$_4$)-CH=C(CN)$_2$; N-substituent: CH$_2$-C$_6$H$_4$-Cl(p) | " | " |
| 103 | Cl$_3$C$_6$H$_2$-O-C$_2$H$_4$-N(C$_2$H$_5$)-C$_6$H$_3$(C$_2$H$_5$)-CH=C(CN)$_2$ | " | " |
| 104 | Cl$_3$C$_6$H(CH$_3$)-O-C$_2$H$_4$-N(C$_2$H$_5$)-C$_6$H$_3$(CH$_3$)-CH=C(CN)$_2$ | greenish-tinged yellow | |
| 105 | Br$_2$C$_6$H(C$_2$H$_5$)-O-C$_2$H$_4$-N(C$_2$H$_5$)-C$_6$H$_3$(CH$_3$)-CH=C(CN)$_2$ | " | " |

—Continued

| Example No. | Dyestuff | Colour shade |
|---|---|---|
| 106 | 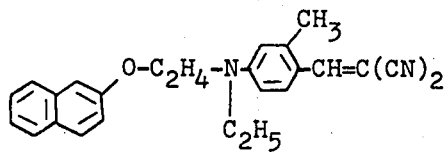 | " " |
| 107 | 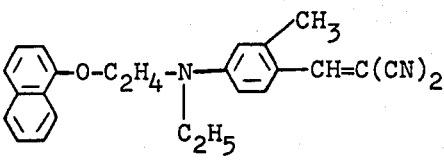 | " " |

EXAMPLE 108

1 Part of the dyestuff of the formula

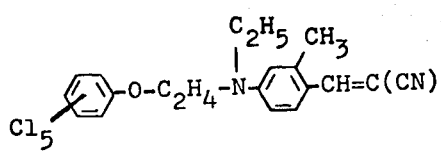

is dissolved in 25 g of dimethylformamide, 1 part of a dispersing agent (alkylaryl polyglycol ether) is added and a fine dispersion is produced by stirring into 4,000 parts by volume of water. 20 g of a carrier (cresotic acid ester) and 4 g of monosodium dihydrogen phosphate are also added thereto and the pH value of the dye bath is adjusted to 4.5–5 with acetic acid. 100 parts of previously cleaned polyester material (polyethylene glycol terephthalate of the Dacron type of Messrs Du-Pont) are introduced into this bath at 40°–50°, the temperature is raised to 80°–85° over the course of 15–20 minutes and is kept thereat for 20 minutes, and the bath is then gradually brought to the boil. After boiling for 1–1.5 hours, the dyeing process is complete. The dyed material is once rinsed hot and then rinsed cold and dried. It displays a clear, greenish-tinged yellow dyeing of very good fastness to light, washing and sublimation.

The dyestuff can also be used as a treated powder by grinding an aqueous paste thereof with a dispersing agent (for example ligninsulphonate) and then drying it.

If the conjoint use of a carrier is dispensed with, a comparable dyeing is obtained by using the high temperature dyeing process (HT process) with a liquor ratio of 1:20. The previously cleaned polyester material is again introduced at 40°–50° into the dye bath which in other respects has been prepared in the same way, the bath temperature is raised to 125° over the course of 30–40 minutes and the material is dyed at this temperature for 1–1.5 hours.

EXAMPLE 109

100 Parts of a cellulose triacetate rayon fabric are dyed for 1 hour at the boil in a dye bath prepared from 1.5 parts of the dyestuff according to Example 10, 4 parts of Marseille soap and 4,000 parts of water. The resulting greenish-tinged yellow dyeing has very good fastness properties.

EXAMPLE 110

1,000 Parts of polystyrene are mixed with 6 parts of the dyestuff according to Example 33 and fused in the usual manner at approx. 200° under a nitrogen atmosphere. The greenish-tinged yellow injection mouldings obtained from this material show good colour fastness.

I claim:

1. Styryl dyestuffs of the formula

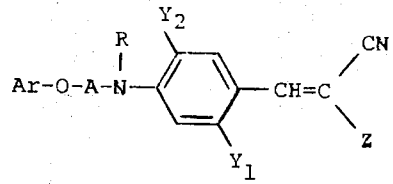

wherein

Ar is selected from the group consisting of
  a. phenyl which contains at least one substituent of the group consisting of unsubstituted $C_{3-12}$alkyl; unsubstituted $C_{5-7}$ cycloalkyl; unsubstituted phenyl $C_{1-3}$ alkyl; methyl, chloro, benzyl, benzyloxy, or naphthyl substituted phenyl $C_{1-3}$ alkyl; unsubstituted $C_{1-12}$alkylmercapto; unsubstituted $C_{5-7}$ cycloalkylmercapto; unsubstituted phenyl $C_1$ to $C_3$ -alkylmercapto; chloro substituted phenyl $C_1$ to $C_3$ alkylmercapto; unsubstituted phenylmercapto; chloro, methyl, propyl, butyl, benzyl, phenyl, phenoxy or cyclohexyl substituted phenylmercapto; unsubstituted naphthyl mercapto; unsubstituted tetrahydronaphthyl mercapto; or a heterylmercapto substituent selected from the group unsubstituted benzthiazolyl mercapto; methyl, ethoxy, or cyclohexyl substituted benzthiazolyl mercapto; unsubstituted naphthothiazolyl; unsubstituted benzoxazolyl; or styryl and wherein the phenyl ring may optionally contain substituents of the group H, $CH_3$, $C_2H_5$, Cl, OH, phenoxy or phenyl;
  b. a naphthalene or 5,6,7,8-tetrahydronaphthalene radical which can be substituted by 1–2 propyl, isopropyl, butyl, isobutyl, tert.-butyl, isoamyl, isooctyl, lauryl, cyclopentyl, cyclohexyl, bicyclo[2.2.1]hept-2-yl, benzyl, $C_1$- to $C_4$-alkylmercapto, benzylmercapto or phenylmercapto groups and/or 1–2 halogen atoms; or
c. trichlorophenyl, tetrachlorophenyl, methyltetrachlorophenyl or pentachlorophenyl and A represents an unsubstituted $C_2$ to $C_4$-alkylene group R denotes an unsubstituted $C_1$ to $C_4$-alkyl group; a $C_1$ to $C_4$-alkyl group substituted by CN, ethoxy, phenoxy, or tolyloxy; unsubstituted $C_5$ to $C_7$-cycloalkyl; unsubstituted phenyl $C_1$ to $C_3$-alkyl; or methyl, butyl or chloro substituted phenyl $C_1$ to $C_3$-alkyl group; $Y_1$ and $Y_2$ denote H, unsubstituted $C_{1-4}$ alkyl, unsubstituted $C_1$ to $C_4$-alkoxy, phenoxy, halogen, $C_2$ to $C_5$-alkanoylamino, benzoylamino or phenyl; and Z is CN, $SO_2Q$, $COQ^1$, $CO_2Q^2$,

wherein
Q is unsubstituted $C_{1-4}$ alkyl, unsubstituted $C_5$ to $C_7$-cycloalkyl, unsubstituted phenyl, butyl substituted phenyl, or unsubstituted naphthyl;

$Q^1$ is unsubstituted $C_{1-4}$ alkyl, unsubstituted $C_5$ to $C_7$-cycloalkyl, unsubstitued phenyl, or unsubstituted naphthyl;

$Q^2$ is unsubstituted $C_{1-4}$ alkyl; cyano, chloro, methoxy, methoxycarbonyl, phenoxy, chlorophenoxy, methylphenoxy, butylphenoxy, naphthyl or cyclohexylphenoxy substituted $C_{1-4}$ alkyl; unsubstituted $C_5$ to $C_7$-cycloalkyl; unsubstituted phenyl $C_1$ to $C_3$-alkyl; chloro substituted phenyl $C_1$ to $C_3$-alkyl; phenylallyl; or unsubstituted naphthyl; and $W^1$ and $W^2$ are H; unsubstituted $C_{1-4}$ alkyl; cyano substituted $C_{1-4}$ alkyl; unsubstituted $C_5$ to $C_7$-cycloalkyl; unsubstituted phenyl; chloro, ethoxy, or butyl substituted phenyl; or unsubstituted naphthyl; or $W^1$ and $W^2$ togoether form a piperidine or pyrrolidine ring.

2. Styryl dyestuffs of the formula

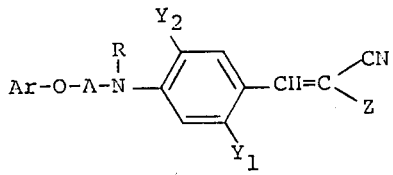

wherein
Ar is selected from the group consisting of
a.

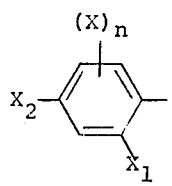

wherein $X_1$ and $X_2$ denote hydrogen, propyl, isopropyl, butyl, isobutyl, tert.-butyl, isoamyl, isooctyl, isononyl, lauryl, cyclopentyl, cyclohexyl, bicyclo[2,2,1]hept-2-yl, benzyl, α,α-dimethylbenzyl, phenethyl, methylmercapto, ethylmercapto, propylmercapto, butylmercapto, benzylmercapto, phenylmercapto, 4-tert.-butylphenylmercapto, 4-chlorophenylmercapto, 4-methylphenylmercapto or benzthiazol-2ylmercapto, with the proviso that $X_1$ and $X_2$ are not simultaneously hydrogen, X denotes hydrogen, methyl, ethyl, tert.-butyl or chlorine, and $n$ represents 1 or 2;

b. a naphthalene or 5,6,7,8-tetrahydronaphthalene radical which can be substituted by 1–2 propyl, isopropyl, butyl, isobutyl, tert.-butyl, isoamyl, isooctyl, lauryl, cyclopentyl, cyclohexyl, bicyclo[2,2,1]hept-2-yl, benzyl, $C_1$- to $C_4$-alkylmercapto, benzylmercapto or phenylmercapto group and/or 1–2 halogen atoms; or c. tetrachlorophenyl, methyltetrachlorophenyl or pentachlorophenyl;

A represents a $C_2$- to $C_4$-alkylene group,

R denotes a $C_1$- to $C_4$-alkyl, $C_5$- to $C_7$-cycloalkyl or phenyl-$C_1$- to -$C_3$-alkyl group, $Y_1$ and $Y_2$ denote hydrogen, $C_1$- to $C_4$-alkyl, $C_1$- to $C_4$-alkoxy, phenoxy, halogen, $C_2$- to $C_5$-alkanoylamino or benzoylamino, and Z represents -CN, -$SO_2Q$, -$COQ^1$, -$CO_2Q^2$ or

wherein
Q, $Q^1$, $Q^2$, $W^1$ and $W^2$ are $C_1$- to $C_4$-alkyl, $C_5$- to $C_7$-cycloalkyl or phenyl-$C_1$- to -$C_3$-alkyl, Q, $Q^1$, $W^1$ or $W^2$ also denote phenyl or naphthyl and $W^1$ and $W^2$ furthermore denote hydrogen or the remaining members of a 5-membered to 7-membered saturated heterocyclic structure and the alkyl radicals mentioned above other than in reference to Ar can be substituted by OH, CN, halogen, or $C_1$- to $C_4$-alkoxy and the phenyl and naphthyl radicals mentioned above other than in reference to Ar can be substituted by halogen, $C_1$- to $C_4$-alkyl, benzyl, cyclopentyl, cyclohexyl or $C_1$- to $C_4$-alkoxy and the dyestuff is otherwise unsubstituted.

3. Styryl dyestuffs according to claim 2, wherein
Ar represents the

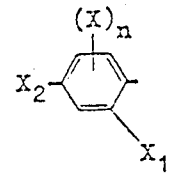

radical
wherein
$X_1$ and $X_2$ denote hydrogen, propyl, isopropyl, butyl, isobutyl, tert.-butyl, isoamyl, isooctyl, isononyl, lauryl, cyclopentyl, cyclohexyl, bicyclo[2.2.1]hept-2-yl, benzyl, α,α-dimethylbenzyl, phenethyl, methylmercapto, ethylmercapto, propylmercapto, butylmercapto, benzylmercapto, phenylmercapto, 4-tert.-butylphenylmercapto, 4-chlorophenylmercapto, 4-methylphenylmercapto or benzthiazol-2-ylmercapto, with the proviso that $X_1$ and $X_2$ are not simultaneously hydrogen, X denotes hydrogen, methyl, ethyl, tert.-butyl or chlorine, $n$ represents 1 or 2 and A represents ethylene, $Y_1$ represents hydrogen, methyl, ethyl, methoxy, ethoxy or chlorine, $Y_2$ represents hydrogen, methyl, methoxy, ethoxy or chlorine, $Z$ represents CN, $C_1$- to $C_4$-alkoxycarbonyl or phenalkoxycarbonyl with 1 to 3 carbon atoms in the alkoxy radical, phenylcarbamoyl or naphthylcarbamoyl and $R$ represents $C_1$- to $C_4$-alkyl or phenyl-$C_1$- to -$C_3$-alkyl.

4. Styryl dyestuffs according to claim 2, wherein $n$, A, $Y_1$, $Y_2$, $Z_1$ and R have the abovementioned meanings and wherein Ar represents a naphthalene or 5,6,7,8-tetrahydronaphthalene radical which can be substituted by 1-2 propyl, isopropyl, butyl, isobutyl, tert.-butyl, isoamyl, isooctyl, lauryl, cyclopentyl, cyclohexyl, bicyclo[2.2.1]hept-2-yl, benzyl, $C_1$- to $C_4$-alkylmercapto, benzylmercapto or phenylmercapto groups and/or 1-2 halogen atoms.

5. Styryl dyestuffs according to claim 2, wherein

Ar represents

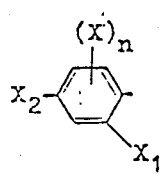

wherein $X_1$ and $X_2$ denote hydrogen, isobutyl, tert.-butyl, cyclohexyl, cyclopentyl, isooctyl, α,α-dimethylbenzyl, benzyl or bicyclo[2.2.1]hept-2-yl, but do not simultaneously represent hydrogen and X, $n$, A, R, $Y_1$, $Y_2$ and Z have the abovementioned meanings.

6. Styryl dyestuffs according to claim 2, wherein

Ar represents tetrachlorophenyl, methyltetrachlorophenyl or pentachlorophenyl and A, R, $Y_1$, $Y_2$ and Z have the abovementioned meanings.

7. Styryl dyestuff according to claim 1, of the formula

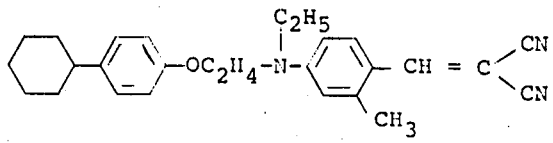

8. Styryl dyestuff according to claim 1, of the formula

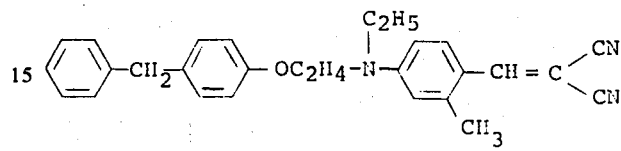

9. Styryl dyestuff according to claim 1, of the formula

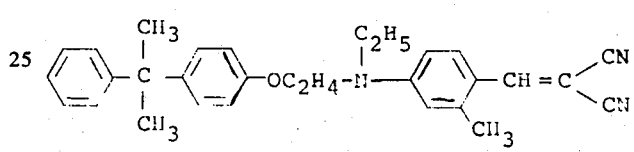

10. Styryl dyestuff according to claim 1, of the formula

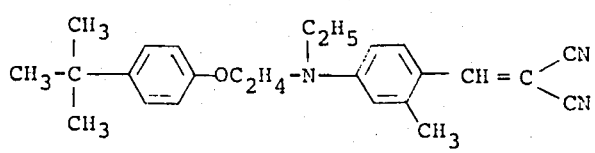

* * * * *